United States Patent
Xu et al.

(10) Patent No.: US 7,443,661 B2
(45) Date of Patent: Oct. 28, 2008

(54) PROTECTION DEVICE FOR CONNECTORS

(75) Inventors: Ji-Guo Xu, Shenzhen (CN); Jin-Cai Shan, Shenzhen (CN); Peng Liu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 468 days.

(21) Appl. No.: 11/156,518

(22) Filed: Jun. 20, 2005

(65) Prior Publication Data

US 2006/0002079 A1 Jan. 5, 2006

(30) Foreign Application Priority Data

Jul. 2, 2004 (CN) ............... 2004 2 00712718 U

(51) Int. Cl.
*G06F 1/16* (2006.01)
(52) U.S. Cl. .................. 361/683; 361/725; 361/726; 312/223.2
(58) Field of Classification Search ......... 361/679–683, 361/725, 726; 174/138 F; 312/223.2
See application file for complete search history.

(56) References Cited

U.S. PATENT DOCUMENTS

| | | | |
|---|---|---|---|
| 4,898,009 A * | 2/1990 | Lakoski et al. ................ 70/58 |
| 4,984,982 A | 1/1991 | Brownlie et al. |
| 5,142,442 A * | 8/1992 | Daniels et al. ............... 361/687 |
| 5,769,646 A | 6/1998 | Cavello et al. |
| 5,816,081 A * | 10/1998 | Johnston ....................... 70/58 |
| 5,837,942 A * | 11/1998 | Becker ...................... 174/138 F |
| 6,017,228 A * | 1/2000 | Verbeek et al. ............. 439/142 |
| 6,341,510 B1 * | 1/2002 | Tervo et al. ................... 70/58 |
| 6,836,405 B2 * | 12/2004 | Alfonso et al. ............. 361/683 |
| 6,970,351 B2 * | 11/2005 | Perez et al. ................ 361/683 |
| 6,985,355 B2 * | 1/2006 | Allirot ....................... 361/683 |
| 7,242,577 B2 * | 7/2007 | Sween et al. ................ 361/683 |

* cited by examiner

*Primary Examiner*—Jayprakash N Gandhi
*Assistant Examiner*—Anthony Q Edwards
(74) *Attorney, Agent, or Firm*—Morris, Manning & Martin LLP; Tim Tingkang Xia

(57) ABSTRACT

A protection device is provided to protect connectors which are to be connected to electronic interfaces at a panel of a computer chassis (10). The protection device includes a bracket (30) secured to the panel, and a cover (50) pivotally attached to the bracket for shielding the connectors. The cover defines a plurality of slots for extension of cables of the connectors therethrough. The slots include a large assembly slot (59), a narrow accommodating slot (58), and a connecting slot communicating the assembly slot and the accommodating slot. The accommodating slot is in alignment with a zone disposed at the panel of the computer chassis having at least one electronic interface for collecting a cable of at least one connector, the assembly slot allowing entrance of the at least one connector is not in alignment with the zone.

16 Claims, 3 Drawing Sheets

PROTECTION DEVICE FOR CONNECTORS

BACKGROUND OF THE INVENTION

1. Field of the Invention

The present invention relates to a protection device for connectors connected to a computer.

2. General Background

Developments in networks and a great diversity of computer performances have resulted in more and more input/output interfaces disposed at a computer chassis. A typical computer chassis includes a plurality of connectors connected with cables. These cables at least includes a power cable, a signal cable connecting a monitor, a mouse cable, a keyboard cable, a network cable, a microphone cord, and a earphone cord, etc. These cables are often in a mess at a rear panel of a computer, thereby resulting inconvenient during assembling or disassembling the computer.

In addition, the connectors at the rear panel are exposed in the air. Dust is often accumulated thereby affecting signal transfer. Furthermore, the connectors connected to the rear panel of the computer chassis are susceptible to being broken of or inadvertently disconnected because the connectors typically extend outwardly from the rear panel in a substantial distance.

What is needed is to provide a protection device for protecting connectors of a computer from contamination or being damaged.

What is also needed is to provide a protection device for protecting connectors and tidily arranging cables of the connectors.

SUMMARY

A protection device in accordance with a preferred embodiment of the present invention is provided to protect connectors which are to be connected to electronic interfaces at a panel of a computer chassis. The protection device includes a bracket secured to the panel, and a cover pivotally attached to the bracket for shielding the connectors. The cover defines a plurality of slots for extension of cables of the connectors therethrough. The slots include a large assembly slot, a narrow accommodating slot, and a connecting slot communicating the assembly slot and the accommodating slot. The accommodating slot is in alignment with a zone disposed at the panel of the computer chassis having at least one electronic interface for collecting a cable of at least one connector, the assembly slot allowing entrance of the at least one connector is not in alignment with the zone.

Other objects, advantages and novel features of the invention will become more apparent from the following detailed description when taken in conjunction with the accompanying drawings, in which:

DETAILED DESCRIPTION OF THE INVENTION

Figure 1:
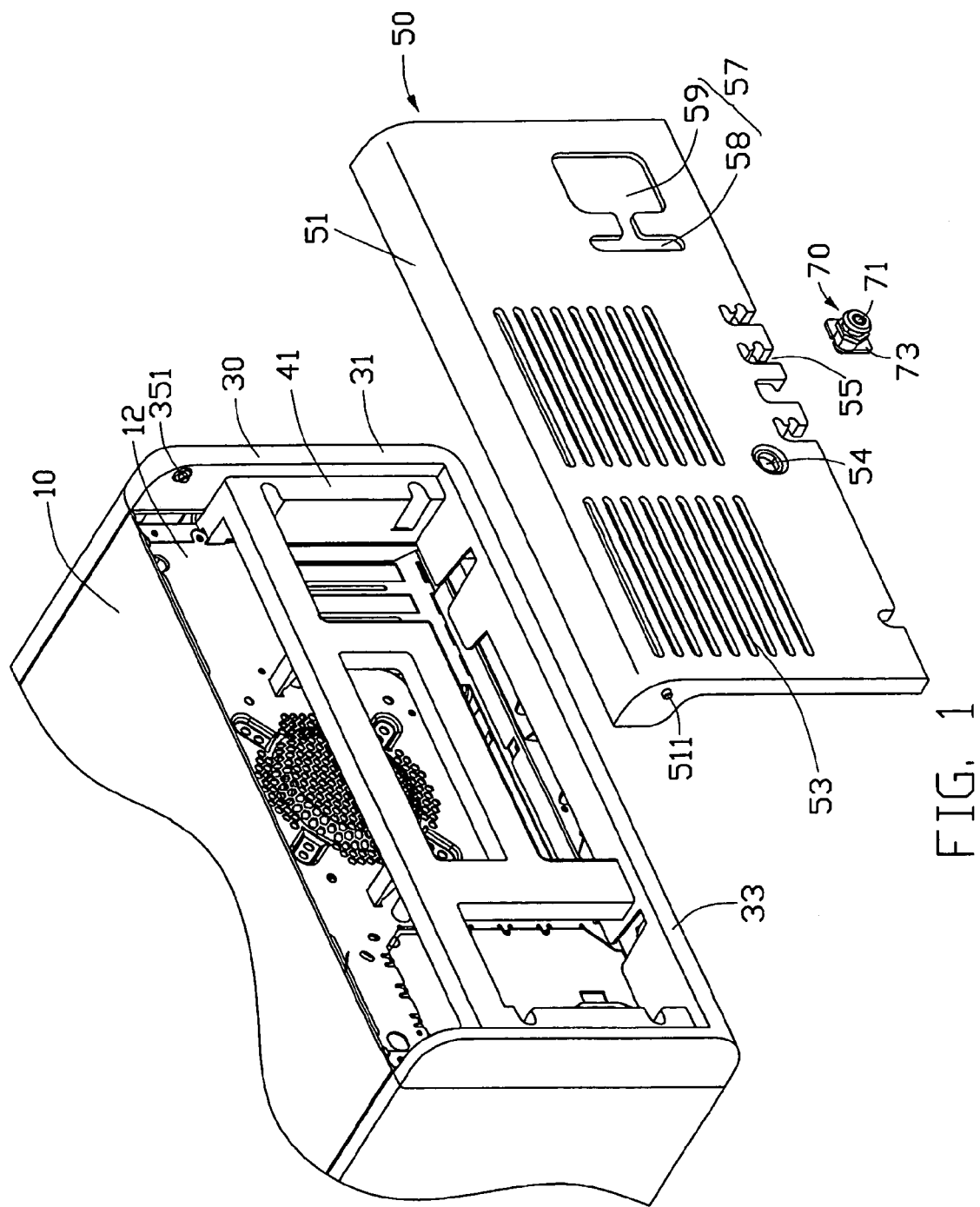
FIG. 1 is an isometric, explosive view of a protection device in accordance with a preferred embodiment of the present invention, the protection device including a bracket secured to a computer chassis, a cover, and a lock.

Referring to FIG. 1, a protection device of an electronic device like a computer for connectors in accordance with a preferred embodiment of the present invention is to be attached to a rear panel 12 of a computer chassis 10. The protection device includes a bracket 30, a cover 50, and a fastening device such as a lock 70.

Figure 2:
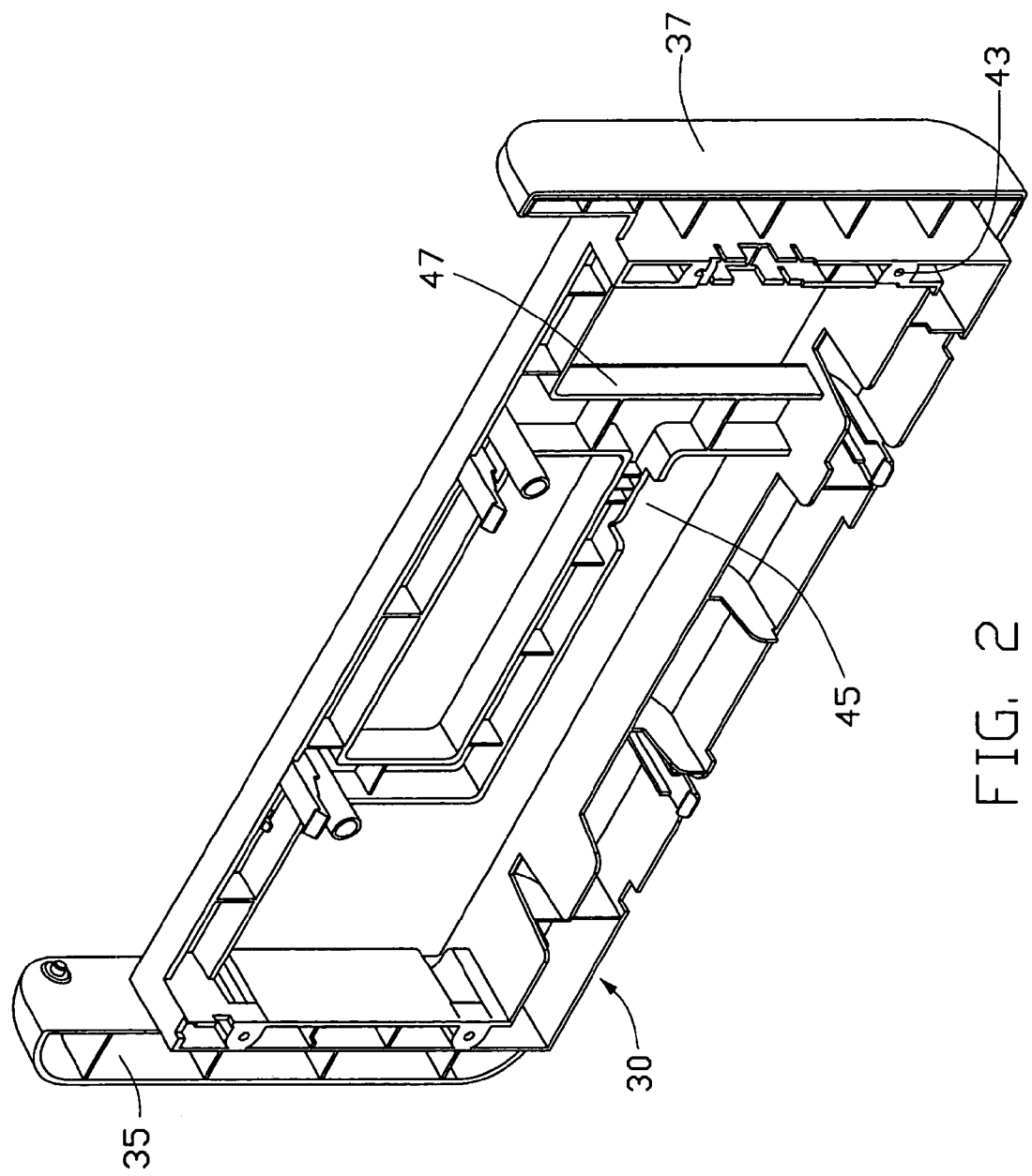
FIG. 2 is an isometric view of the bracket of FIG. 1, viewed from another aspect.

Referring also to FIG. 2, the bracket 30 includes a U-shaped outer frame 31, and an inner frame 41. The outer frame 31 includes a bottom beam 33 and two side beams 35, 37 at two opposite sides of the bottom beam 33. The bottom beam 33 and side beams 35, 37 are intimately attached to the rear panel 12 of the computer chassis 10, and respectively in same planes with a bottom panel and side panels of the computer chassis 10. A pivot 351 extends inwardly from an upper portion of the side beam 35. A pivot hole (invisible) is defined in an upper portion of the side beam 37, and in alignment with the pivot 351.

An outer surface of the inner frame 41 is a recess from an outer surface of the outer frame 31. The inner frame 41 defines four through holes in four corners thereof for extension of screws to secure the bracket 30 to the rear panel 12 of the computer chassis 10. The inner frame 41 functions as reinforcing the bracket 30. The inner frame 41 includes a plurality of bars 47. One of the bars 47 defines a cutout 45 for engaging the lock 70. The bars 47 are so arranged that input/output interfaces at the rear panel are not shield.

Figure 3:
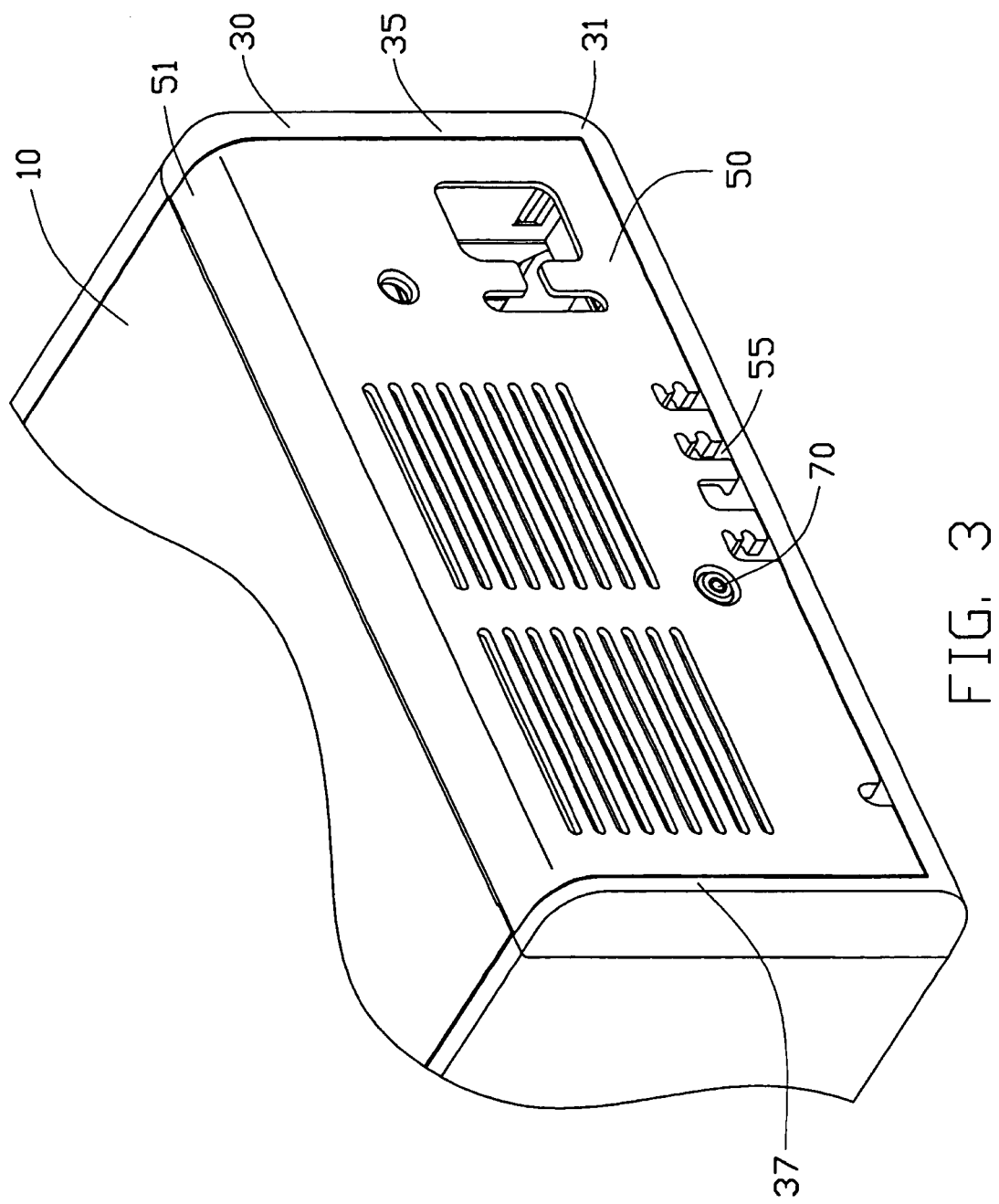
FIG. 3 is an assembled view of FIG. 1.

Referring also to FIG. 3, the cover 50 is rectangular, and defines a plurality of ventilation holes 53 therein. An upper portion of the cover 50 is arc-shaped, and functions as a pivot portion 51. One side of the pivot portion 51 forms a pivot post 511 corresponding to the pivot hole of the side beam 37 of the bracket 30. A pivot hole (invisible) is defined in the other side of the pivot portion 51 corresponding to the pivot 351 of the side beam 35 of the bracket 30. A plurality of slots is defined in the cover 50. The slots include a plurality of notches 55 defined in a lower edge of the cover 50 for extension of cables of the connectors therethrough. The slots also include an opening 57 which includes a narrow accommodating slot 58, and a large assembly slot 59. A slim connecting slot communicates the accommodating slot 58 and the assembly slot 59. The accommodating slot 58 is located aligning with an expansion-slot zone which has input/output electronic interfaces such as expansion cards. The accommodating slot 58 collects cables of the connectors that are connected to the electronic interfaces. There may be more than one accommodating slot 58 communicating with each other. The assemble slot 59 is offset from the expansion card slots. The assemble slot 59 is set to be relatively large because a connector connected to an expansion card sometimes may be large. The accommodating slot 58 is set to be relatively narrow because the connector connected to the expansion card is not allowed to be unscrewed and pulled out through the accommodating slot 58. Thus, the connector and its cable are permitted to be pulled out only when the cover 50 is rotated outwardly.

In assembly, the bracket 30 is secured to the rear panel 12 of the computer chassis 10; the pivot portion 51 of the cover 50 is pivotally engaged to the bracket 30 so as to define an inner space between the rear panel 12, the bracket 30 and the cover 50. The connector extends through the assembly slot 59 and then is connected to the corresponding input/output interface. The cable of the connector is then drawn into the accommodating slot 38 via the connecting slot. The cover 50 is rotated downwardly until an inner surface of the cover 50 abuts against the outer surface of the inner frame 41 of the bracket 30, and an outer surface of the cover 50 is coplanar with the outer surface of the outer frame 31 of the bracket 30. Cables of other connectors are orderly extend through the slots 55 of the cover 50. When the cover 50 is open or closed, the cables are orderly tidied by the slots 55. Each slot 55 may have a jagged design, which may receive more than one cable.

The cover 50 defines a lock hole 54 to receive the lock 70 therein. Referring to FIG. 1, the lock 70 includes a lock core 71 and a latch 73. When the cover 50 is closed, a key is inserted in the lock core 71 and drives the latch 73 to rotate. When the latch 73 is engaged with the bar 47 at the cutout 45, the cover 50 is secured in a locked position. This will prevent an unauthorized person from plugging or pulling out connectors, or from stealing data from a computer.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A protection device for protecting connectors which are to be connected to electronic interfaces at a panel of a computer chassis, the protection device comprising:
   a bracket for being secured to the panel; and
   a cover pivotally attached to the bracket for shielding the connectors, the cover defining a plurality of slots for extension of cables of the connectors therethrough, wherein at least one of the slots comprises a large assembly slot, a narrow accommodating slot, and a slim connecting slot communicating the assembly slot and the accommodating slot, and wherein the accommodating slot is in alignment with a zone disposed at the panel of the computer chassis having at least one electronic interface for receiving a cable of at least one connector and does not allow an enlarged head of the at least one connector to escape, the assembly slot sized to allow entrance of the enlarged head of the at least one connector is not in alignment with said zone.

2. The protection device as claimed in claim 1, wherein the bracket is parallely attached to the panel, and comprises a U-shaped outer frame, and a reinforcing inner frame formed within the U shape being parallel to and spaced from the panel.

3. The protection device as claimed in claim 2, wherein the inner frame is recessed within the outer frame for the cover abutting thereon.

4. The protection device as claimed in claim 1, further comprising a lock for locking the cover to the bracket, wherein the cover defines a lock hole for receiving the lock.

5. The protection device as claimed in claim 1, wherein the slots comprises a plurality of notches defined at an edge of the cover which is far away from a pivot end of the cover to allow the connectors to escape from the cover only when the cover is pivoted open.

6. The protection device as claimed in claim 5, wherein each of the notches is jagged to retain more than one cable.

7. The protection device as claimed in claim 1, wherein the cover defines a plurality of ventilating holes.

8. A protection device for protecting at least one connector, comprising:
   a computer chassis comprising a panel having a zone accommodating at least one electronic interface for connecting said connector; and
   a cover pivotally attached to the chassis for shielding said connector, the cover defining a large assembly slot, a narrow accommodating slot, and a slim connecting slot communicating the assembly slot and the accommodating slot; wherein
   the assembly slot allows said connector extending therethrough, the assembly slot is not in alignment with said zone;
   the accommodating slot in alignment with said zone for collecting a cable of said connector, the accommodating slot does not allow said connector extending therethrough.

9. The protection device as claimed in claim 8, further comprising a bracket parallely secured to the panel of the computer chassis, wherein the bracket comprises a U-shaped outer frame, and a reinforcing inner frame formed within the U shape and being parallel to and spaced from the panel.

10. The protection device as claimed in claim 8, further comprising a lock for locking the cover to the computer chassis, wherein the cover defines a lock hole for receiving the lock.

11. The protection device as claimed in claim 8, wherein the cover defines a plurality of notches in an edge of the cover which is far away from a pivot end of the cover.

12. The protection device as claimed in claim 11, wherein each of the notches is jagged to retain more than one cable.

13. The protection device as claimed in claim 8, wherein the cover defines a plurality of ventilating holes.

14. An electronic device comprising:
   a chassis enclosing said electronic device and comprising a panel having a zone for extending connection of said electronic device; and
   a cover comprising a lateral side pivotably attachable to said chassis beside said panel, said cover defining a large slot allowing a connector cable with an enlarged head, for said extending connection of said electronic device, passing therethrough from outside, and a narrow slot communicating with said large slot and exclusively aligning with said zone of said panel and not allowing said connector cable to escape to outside, said cover being movable between a first position thereof where said cover is positioned to be spaced from and shield said panel of said chassis and surrounds an inner space therein incorporating with said panel, and a second position thereof where said cover is removed away from said first position to reveal said zone of said panel and allow said connector cable entering said inner space and staying in said inner space regardless of movement of said cover between said first position thereof and said second position thereof.

15. The electronic device as claimed in claim 14, further comprising a bracket securable to said chassis so as to pivotally attach said cover thereto and allow said cover pivotally movable between said first and second positions thereof for surrounding said inner space.

16. The electronic device as claimed in claim 14, wherein said cover comprises a plurality of slots defined at an lateral edge thereof opposite to said lateral side, for through passage of said extending connection therein through said lateral edge when said cover is in said second position, and positioning said extending connection when said cover is in said first position.

* * * * *